United States Patent
Lee et al.

(10) Patent No.: US 9,917,304 B2
(45) Date of Patent: *Mar. 13, 2018

(54) PROTECTED ANODE, LITHIUM AIR BATTERY INCLUDING THE SAME, AND METHOD OF PREPARING ION CONDUCTIVE PROTECTIVE LAYER

(71) Applicants: Samsung Electronics Co., Ltd., Suwon-si, Gyeonggi-do (KR); National University Corporation Mie University, Tsu, Mie Prefecture (JP)

(72) Inventors: Dong-joon Lee, Yongin-si (KR); Dong-min Im, Seoul (KR); Victor Roev, Suwon-si (KR); Sang-bok Ma, Suwon-si (KR); Min-sik Park, Hwaseong-si (KR); Osamu Yamamoto, Tsu (JP); Nobuyuki Imanishi, Tsu (JP); Won-sung Choi, Yongin-si (KR); Yasuo Takeda, Tsu (JP)

(73) Assignees: SAMSUNG ELECTRONICS CO., LTD., Gyeonggi-Do (KR); NATIONAL UNIVERSITY CORPORATION MIE UNIVERSITY, Mie Prefecture (JP)

(*) Notice: Subject to any disclaimer, the term of this patent is extended or adjusted under 35 U.S.C. 154(b) by 924 days.

This patent is subject to a terminal disclaimer.

(21) Appl. No.: 14/106,785

(22) Filed: Dec. 15, 2013

(65) Prior Publication Data

US 2014/0178777 A1    Jun. 26, 2014

(30) Foreign Application Priority Data

Dec. 21, 2012  (KR) .................. 10-2012-0151342

(51) Int. Cl.
*H01M 4/40*  (2006.01)
*H01M 12/06*  (2006.01)
(Continued)

(52) U.S. Cl.
CPC ........... *H01M 4/405* (2013.01); *H01M 4/366* (2013.01); *H01M 12/065* (2013.01);
(Continued)

(58) Field of Classification Search
CPC ...... H01M 4/40; H01M 4/485; H01M 4/5825; H01M 12/06; H01M 12/08
See application file for complete search history.

(56) References Cited

U.S. PATENT DOCUMENTS 6,030,909 A    2/2000  Fu
2007/0117007 A1*  5/2007  Visco .................. H01M 2/1646
429/144

(Continued)

FOREIGN PATENT DOCUMENTS

JP    11-031413 A    2/1999

*Primary Examiner* — Kenneth J Douyette
(74) *Attorney, Agent, or Firm* — Cantor Colburn LLP

(57) ABSTRACT

A protected anode including: an anode including lithium or capable of reversibly incorporating lithium ions; and a lithium ion-conductive protective layer on the anode and including a ceramic composite represented by Formula 1:

$$Li_{1+a}Al_bGe_{2-c}M_dP_{3+e}O_{12+f}$$    Formula 1 wherein M is at least one element selected from titanium (Ti), zirconium (Zr), and germanium (Ge), $0 \le a \le 1$, $0 \le b \le 1$, $0 \le c \le 1$, $0 \le d \le 0.5$, $0 \le e \le 0.1$, and $0 \le f \le 1$.

20 Claims, 5 Drawing Sheets

(51) Int. Cl.
  *H01M 4/485* (2010.01)
  *H01M 4/36* (2006.01)
  *H01M 4/38* (2006.01)
  *H01M 4/58* (2010.01)
  *H01M 4/62* (2006.01)

(52) U.S. Cl.
  CPC ............ *H01M 4/382* (2013.01); *H01M 4/485* (2013.01); *H01M 4/5825* (2013.01); *H01M 4/622* (2013.01)

(56) References Cited

U.S. PATENT DOCUMENTS

| | | |
|---|---|---|
| 2009/0123847 A1 | 5/2009 | Okada et al. |
| 2009/0226790 A1 | 9/2009 | Kanamura et al. |
| 2009/0317724 A1 | 12/2009 | Kumar et al. |
| 2011/0262836 A1 | 10/2011 | Kumar et al. |
| 2014/0178775 A1 | 6/2014 | Lee et al. |

\* cited by examiner

PROTECTED ANODE, LITHIUM AIR BATTERY INCLUDING THE SAME, AND METHOD OF PREPARING ION CONDUCTIVE PROTECTIVE LAYER

CROSS-REFERENCE TO RELATED APPLICATIONS

This application claims priority to and the benefit of Korean Patent Application No. 10-2012-0151342, filed on Dec. 21, 2012, and all the benefits accruing therefrom under 35 U.S.C. § 119, the content of which is incorporated herein by reference in its entirety.

BACKGROUND

1. Field

The disclosure relates to a protected anode, a lithium air battery including the protected anode, and a method of manufacturing lithium ion-conductive protective layer.

2. Description of the Related Art

In general a lithium air battery includes an anode capable of intercalating and deintercalating lithium ions, a cathode using oxygen as a cathode active material and a catalyst for oxidizing and reducing oxygen, and a lithium ion-conducting medium disposed between the cathode and the anode.

Lithium air batteries have a theoretical specific energy of about 3000 Wh/kg or greater, which is equivalent to about ten times that of lithium ion batteries. Furthermore, because they are more environmentally friendly and safer in use than lithium ion batteries, lithium air batteries are increasingly being developed.

As an anode active material of a lithium air battery, a lithium metal with high capacity may be used. When lithium metal is used as the anode, solid-phase lithium metal is disassociated to provide lithium ions in an electrolyte during discharging, which are then deposited back as lithium metal during charging. With repeated charging and discharging, dendritic lithium is generated, which consequently lowers charge/discharge efficiency and causes the anode to be disconnected from the cathode. The anode using lithium metal may react with most liquid electrolyte materials to increase the surface resistance of the anode, lower reaction uniformity therein, and deteriorate charge-discharge reversibility. Thus there remains a need for an improved lithium battery anode material.

SUMMARY

Provided are a protected anode which is capable of intercalating and deintercalating lithium ions and is less vulnerable to side reactions, and a lithium air battery including the protected anode.

Additional aspects will be set forth in part in the description which follows and, in part, will be apparent from the description.

According to an aspect, a protected anode includes: an anode including lithium or a material capable of reversibly incorporating lithium ions; and a lithium ion-conductive protective layer on the anode and including a ceramic composite represented by Formula 1:

Formula 1 wherein, M is at least one element selected from titanium (Ti), zirconium (Zr), and germanium (Ge), $0 \leq a \leq 1$, $0 \leq b \leq 1$, $0 \leq c \leq 1$, $0 \leq d \leq 0.5$, $0 \leq e \leq 0.1$, and $0 \leq f \leq 1$.

The ceramic composite may be represented by Formula 2:

Formula 2 wherein, M may be at least one element selected from titanium (Ti), zirconium (Zr), and germanium (Ge), $-0.1 \leq a' \leq 0.1$, $-0.1 \leq b' \leq 0.1$, $-0.1 \leq c' \leq 0.1$, $0.04 < d' \leq 0.4$, $0 \leq e' \leq 0.1$, and $0 \leq f' \leq 0.9$.

In some embodiments, the lithium ion-conductive protective layer may be porous.

The lithium ion-conductive protective layer may further include a cross-linkable first polymer, which is disposed in pores of the lithium ion-conductive protective layer.

The cross-linkable first polymer may include at least one selected from an epoxy resin, an acryl resin, a polyamide resin, a polyimide resin, a polyimide amide resin, a polycarbonate resin, a polyester resin, a phenol resin, a polyurethane resin, and a melamine resin.

According to another aspect, a method of preparing a lithium ion-conductive protective layer includes: thermally treating a mixture of a ceramic compound represented by Formula 3

Formula 3 wherein, $0 \leq a'' \leq 1$, $0 \leq b'' \leq 1$, $0 \leq c'' \leq 1$, $0 \leq e'' \leq 0.1$, and $0 \leq f'' \leq 1$, and at least one inorganic oxide selected from $TiO_2$, $ZnO_2$, and $GeO_2$ to obtain a thermal-treatment product; shaping the thermal-treatment product as a film; and thermally treating the film to obtain the lithium ion-conductive protective layer.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Reference will now be made in detail to embodiments of a protected anode, a lithium air battery including the protected anode, and a method of preparing a lithium ion-conductive layer, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed. "Or" means "and/or." Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

According to an embodiment, a protected anode includes: an anode including lithium or a material capable of reversibly incorporating, e.g., intercalating and deintercalating, lithium ions; and a lithium ion-conductive protective layer on the anode and including a ceramic composite represented by Formula 1:

$$Li_{1+a}Al_bGe_{2-c}M_dP_{3+e}O_{12+f}$$  Formula 1

In Formula 1, M is at least one element selected from titanium (Ti), zirconium (Zr), and germanium (Ge), $0 \leq a \leq 1$, $0 \leq b \leq 1$, $0 \leq c \leq 1$, $0 \leq d \leq 0.5$, $0 \leq e \leq 0.1$, and $0 \leq f \leq 1$.

The material capable of reversibly incorporating lithium ions may comprise any suitable element or compound capable of reversibly incorporating, e.g., intercalating and deintercalating, lithium ions. The element or compound capable of reversibly incorporating lithium ions may be at least one selected from carbon, tin, or an oxide, e.g., titanium dioxide or tin oxide, or sulfide such as titanium disulfide. Suitable carbons include at least one selected from ketjen black, carbon black, graphite, carbon nanotubes, carbon fiber, mesoporous carbon, mesocarbon microbeads, oil furnace black, extra-conductive black, acetylene black, and lamp black.

The lithium ion-conductive protective layer includes a ceramic-based composite material having lithium ion conductivity and which is not substantially permeable to a liquid electrolyte. The lithium ion-conductive protective layer may be disposed on a surface of the anode, which is capable of reversibly incorporating lithium ions, to substantially or effectively prevent a reaction between the lithium anode and a cathode or an electrolyte component. The lithium ion-conductive protective layer may also substantially or effectively prevent an electrical short even when a dendrite is present on the surface of the lithium anode.

A ceramic composite for forming the lithium ion-conductive protective layer may be obtained by disposing, e.g., doping, a Li—Ti—Al—PO$_4$-based ceramic base compound with at least one inorganic oxide selected from TiO$_2$, ZnO$_2$, and GeO$_2$, and sintering the resulting product. Inorganic oxides such as TiO$_2$, ZnO$_2$, and GeO$_2$ are materials having insulating characteristics. Unlike when used as a simple mixture, these inorganic oxides may become conducting when sintered with a Li—Ti—Al—PO$_4$-based ceramic compound to form a ceramic composite comprising a Li—Ti—Al—PO$_4$ backbone doped with the inorganic oxide. The ceramic composite obtained by doping the ceramic base compound with such an inorganic oxide and sintering the doped ceramic base compound may have improved ionic conductivity compared with that of the undoped ceramic based compound.

The ceramic composite may be represented by Formula 1:

$$Li_{1+a}Al_bGe_{2-c}M_dP_{3+e}O_{12+f} \quad \text{Formula 1}$$

In Formula 1, M may be at least one element selected from titanium (Ti), zirconium (Zr), and germanium (Ge), $0 \leq a \leq 1$, $0 \leq b \leq 1$, $0 \leq c \leq 1$, $0 \leq d \leq 0.5$, $0 \leq e \leq 0.1$, and $0 \leq f \leq 1$.

The stoichiometry of the ceramic composite of Formula 1 above may be selected by selecting the type of the ceramic based compound, the type and amount of the inorganic oxide as a dopant, and process conditions. The ceramic composite of Formula 1 above may be prepared using any of various methods.

In some embodiments, the ceramic composite may be represented by Formula 2:

$$Li_{1.4+a'}Al_{0.4+b'}Ge_{1.6+c'}M_dP_{3+e'}O_{12+f'} \quad \text{Formula 2}$$

In Formula 2, M may be at least one element selected from titanium (Ti), zirconium (Zr), and germanium (Ge), $-0.1 \leq a' \leq 0.1$, $-0.1 \leq b' \leq 0.1$, $-0.1 \leq c' \leq 0.1$, $0.04 < d' \leq 0.4$, $0 \leq e' \leq 0.1$, and $0 \leq f' \leq 0.9$.

The ceramic composite of Formula 2 above may be obtained by, for example, doping a $Li_{1.4}Al_{0.4}Ge_{1.6}(PO_4)_3$ ceramic base.

The lithium ion-conductive protective layer including the ceramic composite may be porous. Pores of the lithium ion-conductive protective layer may further be filled with a cross-linkable first polymer to obtain an organic-inorganic composite. In this regard, the first polymer may be chemically or physically bound to at least some of the pores of the ceramic composite. Filling the pores of the ceramic composite with a cross-linkable first polymer may suppress infiltration of impurities through the pores and/or cracks.

The first polymer may be a material having a lithium ion conductivity of about $10^{-4}$ Siemens per centimeter (S/cm) or less, and in some embodiments, from about $10^{-30}$ S/cm to about $10^{-4}$ S/cm, and in some other embodiments, from about $10^{-15}$ S/cm to about $10^{-5}$ S/cm, and in still other embodiments, from about $10^{-15}$ S/cm to about $10^{-6}$ S/cm. When the lithium ion conductivity of the first polymer is within these ranges, the lithium ion-conductive protective layer may be selectively permeable to lithium ions while blocking infiltration of impurities through pores and/or cracks.

The first polymer may be a cross-linkable polymer. The first polymer may include a thermosetting resin, i.e., a thermoset. For example, the first polymer may include at least one selected from an epoxy resin, acryl resin, polyamide resin, polyimide resin, polyimide-amide resin, polycarbonate resin, polyester resin, phenol resin, polyurethane resin, and melamine resin.

An amount of the first polymer may be from about 0.01 parts to about 20 parts by weight, and in some embodiments, from about 0.01 parts to about 10 parts by weight, based on 100 parts by weight of the lithium ion-conductive protective layer. When the amount of the first polymer is within these ranges, infiltration of a liquid electrolyte component or impurities may be suppressed.

Moisture permeability characteristics of a certain membrane may be evaluated from the permeability to Cl⁻ ions, which may pass in hydrated form across the membrane. In some embodiments, the lithium ion-conductive protective layer may have a moisture permeability equivalent to pass about 100 milligrams per liter (mg/L) or less of Cl⁻ ions per day.

When an anode has the lithium ion-conductive protective layer including the ceramic composite described above, the anode may have improved charge and discharge characteristics and improved capacity characteristics.

Figure 1:
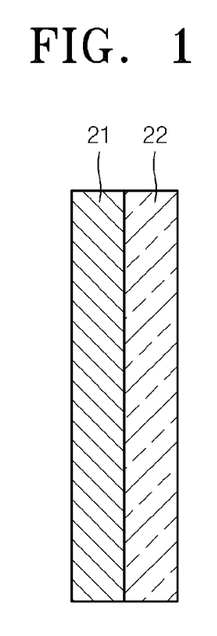
FIG. 1 illustrates a structure of an embodiment of a protected anode.

FIG. 1 is a schematic view of a structure of a protected anode according to an embodiment.

Referring to FIG. 1, the protected anode has a structure including an anode 21 including lithium or a material capable of reversibly incorporating, e.g., intercalating and deintercalating, lithium ions and a lithium ion-conductive protective layer 22 on the anode 21, the lithium ion-conductive protective layer 22 including the ceramic composite of Formula 1 above. The protected anode of FIG. 1 may have high stability without having an intermediate layer between the anode 21 and the lithium ion-conductive protective layer 22, and thus may have improved charge and discharge characteristics and improved conductivity characteristics.

A thickness ratio of the anode 21 to the lithium ion-conductive protective layer 22 may be from about 0.001 to about 1000, and in some embodiments, from about 0.01 to about 100, but is not specifically limited.

The anode 21 may have a thickness from about 10 micrometers (μm) to about 300 μm. The lithium ion-conductive protective layer 22 may have a thickness from about 1 μm to about 500 μm, and in some embodiments, from about 10 μm to about 500 μm. A total thickness of the anode 21 and the lithium ion-conductive protective layer 22 may be from about 20 μm to about 800 μm.

In some embodiments, the protected anode may further include at least one intermediate layer between an anode and a lithium ion-conductive protective layer, the at least one intermediate layer comprising at least one material selected from a liquid electrolyte including a separator, a non-aqueous solvent, and a lithium salt, an inorganic solid electrolyte membrane, a polymer solid electrolyte membrane, a gel-type solid electrolyte membrane, and a lithium ion-conductive solid electrolyte membrane.

The liquid electrolyte may include a non-aqueous solvent and a lithium salt.

Non-limiting examples of the non-aqueous solvent are a carbonate-based solvent, an ester-based solvent, an ether-based solvent, a ketone-based solvent, an amine-based solvent, and a phosphine-based solvent.

Non-limiting examples of the carbonate-based solvent are dimethyl carbonate ("DMC"), diethyl carbonate ("DEC"), ethyl methyl carbonate ("EMC") dipropyl carbonate ("DPC"), methyl propyl carbonate ("MPC"), ethyl propyl carbonate ("EPC"), methyl ethyl carbonate ("ME"C), ethylene carbonate ("EC"), propylene carbonate ("PC"), and butylene carbonate ("BC").

Non-limiting examples of the ester-based solvent are methyl acetate, ethyl acetate, n-propyl acetate, dimethyl acetate, methyl propionate ("MP"), ethyl propionate, γ-butyrolactone, decanolide, valerolactone, mevalonolactone, and caprolactone.

Non-limiting examples of the ether-based solvent are dibutyl ether, tetraglyme, diglyme, dimethoxyethane, 2-methyltetrahydrofuran, and tetrahydrofuran. An example of the ketone-based solvent is cyclohexanone.

Non-limiting examples of the amine-based solvent are triphenylamine and triphenylamine. An example of the phosphine-based solvent is triethylphosphine. The embodiments are not limited to the above, and any appropriate aprotic solvent available in the art may be used.

Non-limiting examples of the aprotic solvent are nitriles (such as compounds of the formula R—CN, wherein R is a C2-C20 linear, branched, or cyclic hydrocarbon-based moiety that may include a double-bonded aromatic ring or an ether bond), amides (such as dimethylformamide), dioxolanes (such as 1,3-dioxolane), and sulfolanes.

The aprotic solvent may be used alone or in a combination thereof. In the latter, a mixing ratio of the at least two aprotic solvents may be appropriately selected depending on a desired performance of a battery, and the ratio may be determined by one of ordinary skill in the art without undue experimentation.

The liquid electrolyte may include an ionic liquid.

Non-limiting examples of the ionic liquid are linear or branched substituted compounds including cations of ammonium, imidazolium, pyrrodidinium, or piperidinium, and anions of $PF_6^-$, $BF_4^-$, $CF_3SO_3^-$, $(CF_3SO_2)_2N^-$, $(C_2F_5SO_2)_2N^-$, $(C_2F_5SO_2)_2N^-$, and $(CN)_2N^-$.

The lithium salt that is dissolvable in a solvent may serve as a source of lithium ions for the lithium air battery. The lithium salt may facilitate migration of lithium ions between the anode and the electrolyte membrane.

The lithium salt may be one or at least two selected from $LiPF_6$, $LiBF_4$, $LiSbF_6$, $LiAsF_6$, $LiN(SO_2C_2F_5)_2$, $Li(CF_3SO_2)_2N$, $LiC_4F_9SO_3$, $LiClO_4$, $LiAlO_2$, $LiAlCl_4$, $LiN(C_xF_{2x+1}SO_2)(C_yF_{2y+1}SO_2)$ wherein x and y are natural numbers, LiF, LiBr, LiCl, LiI, and $LiB(C_2O_4)_2$ (LiBOB; lithium bis(oxalato) borate).

A concentration of the lithium salt may be from about 0.01 molar (M) to about 10 M, and in some embodiments, from about 0.1 M to about 2.0 M. When the amount of the lithium salt is within these ranges, the electrolyte may have an appropriate conductivity and viscosity, and thus may improve the performance of the electrolyte and allow lithium ions to effectively migrate.

The liquid electrolyte may further include a metal salt, in addition to the lithium salt, for example, $AlCl_3$, $MgCl_2$, NaCl, KCl, NaBr, KBr, or $CaCl_2$.

The separator may have any composition having sufficient durability in an operational environment of a lithium air battery. The separator may include at least one selected from a polyethylene oxide-based polymer, a polypropylene-based polymer, a polyacrylonitrile-based polymer, a polyvinylidene-fluoride-based polymer, and a polymethylmethacrylate-based polymer. For example, the separator may be a porous film of polypropylene or polyethylene, a polymeric non-woven fabric of polypropylene or polyphenylene sulfide, or a combination of at least two thereof.

The inorganic solid electrolyte membrane may include, for example $Cu_3N$, $Li_3N$, or LiPON.

The polymer solid electrolyte membrane may be a polyethylene oxide membrane.

In some embodiments, the intermediate layer may further include an insulating inorganic filler. For example, the insulating inorganic filler may be at least one selected from $SiO_2$, $BaTiO_3$, $TiO_2$, $Al_2O_3$, and $Li_2CO_3$.

The insulating inorganic filler may have a particle diameter of about 100 nanometers (nm) or less, and in some embodiments, about 50 nm or less, and in some other embodiments, from about 1 nm to about 50 nm, and in still other embodiments, from about 1 nm to about 25 nm. If the particle diameter of the insulating inorganic filler is too large, a specific surface area of the insulating inorganic filler may become small.

An amount of the insulating inorganic filler may be about 10 weight percent (wt %) or less, and in some embodiments, about 8 wt % or less, and in some other embodiments, about 6 wt % or less, based on a total weight of the intermediate layer. For example, an amount of the insulating inorganic filler may be from about 1 wt % to about 10 wt % based on a total weight of the intermediate layer. When the amount of the insulating inorganic filler is beyond the foregoing range, the ionic conductivity of the intermediate layer may become insufficient.

The intermediate layer may have a thickness from about 10 μm to about 200 μm.

The intermediate layer may have an ionic conductivity of about $2 \times 10^{-3}$ Siemens per centimeter (S/cm) or greater, a lithium ion transfer coefficient of about 0.16 or greater, and a lithium ion mobility of about $1.1 \times 10^{-6}$ square centimeters per volts-seconds ($cm^2$/V. sec) or greater.

According to another embodiment, a lithium air battery includes one of the above-described protected anodes according to the embodiments, and a cathode.

Hereinafter, lithium air batteries according to embodiments will be described in detail.

Figure 2A:
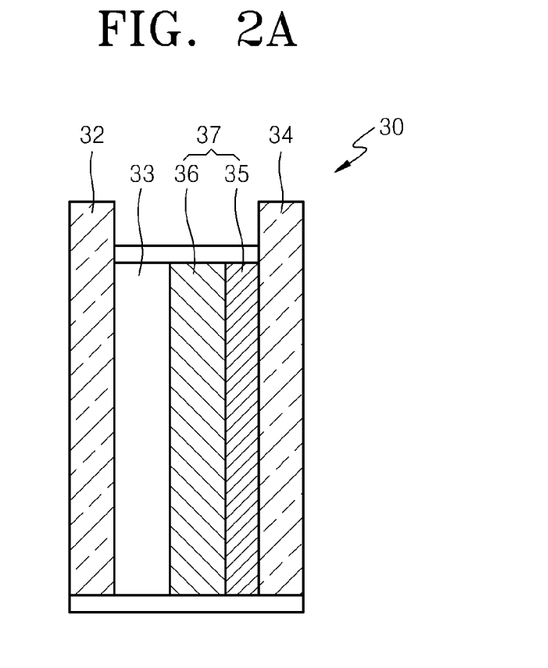
FIGS. 2A and 2B are schematic views of embodiments of lithium air batteries.
Figure 2B:
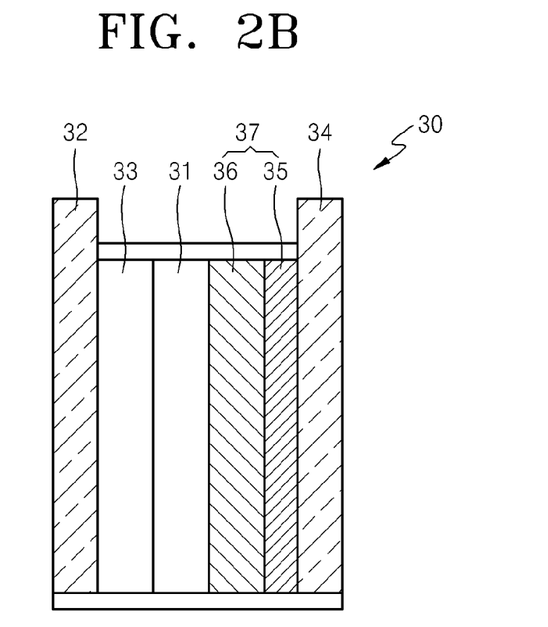

FIGS. 2A and 2B are schematic views of a lithium air battery 30 according to an embodiment. Referring to FIGS. 2A and 2B, the lithium air battery 30 includes a cathode 33 disposed on a first current collector 32 and including oxygen as an active material, and a protected anode 37 disposed adjacent to a second current collector 34. The protected anode 37 includes an anode 35 capable of reversibly incorporating, e.g., intercalating and deintercalating, lithium ions and a lithium ion-conductive protective layer 36 including a ceramic composite of Formula 1 above.

The lithium air battery 30 may further include at least one intermediate layer (not shown) between the anode 35 and the lithium ion-conductive protective layer 36, the at least one intermediate layer being selected from a liquid electrolyte including a non-aqueous solvent and a lithium salt, an inorganic solid electrolyte membrane, a polymer solid electrolyte membrane, a gel-type solid electrolyte membrane, and a separator.

The lithium air battery 30 may have a structure without having an intermediate layer between the protected anode 37 and the cathode 33, as illustrated in FIG. 2A. In some embodiments, the lithium air battery 30 may have at least one intermediate layer 31 between the protected anode 37 and the cathode 33, as illustrated in FIG. 2B, the at least one intermediate layer being selected from a separator, a liquid electrolyte including a non-aqueous solvent and a lithium salt, an inorganic solid electrolyte membrane, a polymer solid electrolyte membrane, a gel-type solid electrolyte membrane, and a lithium ion-conductive solid electrolyte membrane.

The intermediate layer 31 may include a liquid electrolyte including a non-aqueous solvent and a lithium salt, an inorganic solid electrolyte membrane including at least one selected from $Cu_3N$, $Li_3N$, and LiPON, a polymer electrolyte membrane, or a combination thereof.

The non-aqueous solvent may be the same as described above.

The thicknesses of the elements in FIGS. 2A and 2B are not limited thereto.

The liquid electrolyte may be partially or fully impregnated into the anode.

The polymer electrolyte may be prepared by mixing a lithium ion-conductive polymer and a lithium salt.

The amount and type of the lithium salt are the same as described above in conjunction with the protected anodes.

The lithium ion-conductive polymer may be at least one selected from polyethylene oxide, polyacrylonitrile, and polyester.

A lithium ion-conductive solid electrolyte membrane as the intermediate layer may include at least one selected from an inorganic material and a polymer solid electrolyte component.

The lithium ion-conductive solid electrolyte membrane may be a glass-ceramic solid electrolyte, or a laminated structure of a glass-ceramic solid electrolyte and a polymer solid electrolyte. The lithium ion-conductive solid electrolyte membrane will now be described in greater detail.

The lithium ion-conductive solid electrolyte membrane may include an inorganic material including lithium ion-conductive glass, a lithium ion-conductive crystal (ceramic or glass-ceramic), or a combination thereof. For example, the lithium ion-conductive solid electrolyte membrane may include an oxide, in view of chemical stability.

When the lithium ion-conductive solid electrolyte membrane includes a large amount of lithium ion-conductive crystals, a high ionic conductivity may be attainable. For example, the lithium ion-conductive solid electrolyte membrane may include about 50 wt % or greater, about 55 wt % or greater, or about 60 wt % or greater of lithium ion-conductive crystals, based on a total weight of the lithium ion-conductive solid electrolyte membrane.

The lithium ion-conductive crystals may be lithium-ion conductive particles having a Perovskite structure, such as $Li_3N$, LISICON, $La_{0.55}Li_{0.35}TiO_3$, and the like, $LiTi_2P_3O_{12}$ crystals having a NASICON structure, or a glass-ceramic able to precipitate these crystals.

For example, the lithium ion-conductive crystals may be $Li_{1+x+y}(Al, Ga)_x(Ti, Ge)_{2-x}Si_yP_{3-y}O_{12}$ crystals (where $0 \leq x \leq 1$, and $1 \leq y \leq 1$, and for example, $0 \leq x \leq 0.4$ and $0 \leq y \leq 0.6$, or $0.1 \leq x \leq 0.3$ and $0 \leq y \leq 0.4$). Crystals not including grain boundaries that may impair ionic conductivity and may be advantageous in terms of conductivity. For example, a glass-ceramic substantially free of pores or grain boundaries that impair conduction of ions may have high ionic conductivity and high chemical stability.

Non-limiting examples of the lithium ion-conductive glass-ceramic are lithium-aluminum-germanium-phosphate ("LAGP"), lithium-aluminum-titanium-phosphate ("LATP"), and lithium-aluminum-titanium-silicon-phosphate ("LATSP").

For example, when a parent glass with a composition of $Li_2O$—$Al_2O_3$—$TiO_2$—$SiO_2$—$P_2O_5$ is thermally treated for crystallization, a main crystal phase of $Li_{1+x+y}Al_xTi_{2-x}Si_yP_{3-y}O_{12}$ ($0 \leq x \leq 1$ and $0 \leq y \leq 1$) may be obtained. For example, $0 \leq x \leq 0.4$ and $0 \leq y \leq 0.6$, and in some embodiments, $0.1 \leq x \leq 0.3$ and $0.1 \leq y \leq 0.4$.

As used herein, the pores or grain boundaries blocking conduction of ions refer to a structure that lowers the conductivity of the entire inorganic material including lithium ion-conductive crystals to 1/10 or less of the conductivity of the lithium ion-conductive crystals of the inorganic material.

The terms "glass-ceramic" refers to a material obtained by thermally treating glass to educe crystalline phases from glass phases in the glass, the glass-ceramic including amorphous solid and crystals. The glass-ceramic may also refer to a material completely phase-transitioned from glass phases to crystalline phases, for example, a material with a 100% crystallization degree. In some embodiments the glass-ceramic may include a material having a 100% by mass of degree of crystallization. The glass-ceramic includes nearly zero pores among crystal particles or in a crystal even when fully crystallized 100%.

Since the lithium ion-conductive solid electrolyte membrane includes a large amount of glass-ceramic, a high ionic conductivity may be obtained. The lithium ion-conductive solid electrolyte membrane may include about 80 wt % or to 99.9 wt % of lithium ion-conductive glass-ceramic, and in some embodiments, about 85 wt % or greater, or about 90 wt % or greater to obtain high ionic conductivities.

A $Li_2O$ component in the glass-ceramic may serve as a $Li^+$ ion carrier, and is an effective component for lithium-ion conductivity. To easily obtain a high ionic conductivity, an amount of the $Li_2O$ component may be about 12% to about 18%, about 13%, or about 14% based on the glass-ceramic. When the amount of the $Li_2O$ component is too high, thermal stability of the glass-ceramic, and conductivity of the glass-ceramic may be highly likely to deteriorate. Accordingly, an upper limit in the amount of the $Li_2O$ component may be about 18%, 17%, or 16%.

An $Al_2O_3$ component in the glass-ceramic may improve thermal stability of the parent glass, and may improve lithium-ion conductivity by being present as $Al^{3+}$ ions in a crystal phase. To facilitate these effects, a lower limit in the amount of the $Al_2O_3$ component may be about 5% to about 10%, about 5.5%, or about 6%. When the amount of the $Al_2O_3$ component exceeds 10%, thermal stability of the glass-ceramic, and conductivity of the glass-ceramic may be highly likely to deteriorate. Accordingly, an upper limit in the amount of the $Al_2O_3$ component may be about 10%, 9.5%, or 9%.

A $TiO_2$ component in the glass-ceramic, as a component in a crystal phase, is an effective component involved in formation of glass and the crystal phase. To facilitate glass formation and educe a main crystal phase thereof on the glass to obtain higher ionic conductivity, a lower limit in the amount of the $TiO_2$ component may be about 35% to about 45%, 36%, or 37%. When the amount of the $TiO_2$ component is too high, thermal stability of the glass-ceramic, and conductivity of the glass-ceramic may be highly likely to deteriorate. Accordingly, an upper limit in the amount of the $Al_2O_3$ component may be about 45%, 43%, or 42%.

A $SiO_2$ component in the glass-ceramic may improve melting properties and thermal stability of the parent glass, and may improve lithium-ion conductivity by being present as $Si^{4+}$ ions in a crystal phase. To facilitate these effects, a lower limit in the amount of the $SiO_2$ component may be about 1% to about 10%, about 2%, or about 3%. When the amount of the $SiO_2$ component is too high, conductivity of the glass ceramic may be highly likely to deteriorate. Accordingly, an upper limit in the amount of the $SiO_2$ component may be about 10%, 7%, or 7%.

A $P_2O_5$ component in the glass-ceramic, as a component in a crystal phase, is an effective component involved in formation of glass and the crystal phase. When an amount of the $P_2O_5$ component is less than about 30%, glassification may not occur. Accordingly, a lower limit in the amount of the $TiO_2$ component may be about 30% to about 40%, 32%, or 32%. When the amount of the $P_2O_5$ component exceeds 40%, the crystal phase may not be educed from glass, and desired characteristics may be not attainable. Accordingly, an upper limit in the amount of the $P_2O_5$ component may be about 40%, 39%, or 38%.

When the glass-ceramic has the above-composition, glass may be easily formed by casting molten glass, and the glass-ceramic in a crystal phase obtained by thermally treating the glass may have a high lithium-ion conductivity of about $1 \times 10^{-3}$ S·cm$^{-1}$.

When a glass-ceramic having a similar crystalline structure as above, not the same composition as above, is used, the $Al_2O_3$ component and the $TiO_2$ component may be partially or fully substituted with a $Ga_2O_3$ component and a GeO$_2$ component, respectively. In some other embodiments, to lower a melting point of glass-ceramic or improve the stability of glass, a trace of an additional material may be in a range of amounts not to seriously deteriorate ionic conductivity.

The lithium ion-conductive solid electrolyte membrane may further include a polymer solid electrolyte, in addition to the glass-ceramic. For example, the polymer solid electrolyte may be a polyethylene oxide doped with a lithium salt. The polymer solid electrolyte may include at least one selected from LiN(SO$_2$CF$_2$CF$_3$)$_2$, LiBF$_4$, LiPF$_6$, LiSbF$_6$, LiAsF$_6$, LiClO$_4$, LiCF$_3$SO$_3$, LiN(SO$_2$CF$_3$)$_2$, LiN(SO$_2$C$_2$F$_5$)$_2$, LiC(SO$_2$CF$_3$)$_3$, LiN(SO$_3$CF$_3$)$_2$, LiC$_4$F$_9$SO$_3$, and LiAlCl$_4$.

The polymer solid electrolyte membrane may form a laminated structure with the glass-ceramic. The glass-ceramic may be disposed between a first polymer solid electrolyte and a second polymer solid electrolyte that each independently include a component of the above listed components.

The lithium ion-conductive solid electrolyte membrane may be used as a single layer or in a plurality of layers.

The cathode, using oxygen as a cathode active material, may include a conductive material. The conductive material may be porous. Any porous and conductive material may be used as a material of the cathode, and in some embodiments, a porous carbonaceous material may be used. Suitable carbonaceous materials include carbon black, graphite, graphene, activated carbon, carbon fibers, and combinations thereof. Metallic conductive materials, including metal fibers and metal meshes, may be used. Metal powder of copper, silver, nickel, aluminum, and the like may be used. Organic conductive materials, such as polyphenylene derivatives, may be used. The above-listed conductive materials may be used alone or in a combination.

The cathode may further include a catalyst that helps oxidation and reduction of oxygen. Examples of the catalyst include, but are not limited to, precious metal-based catalysts, such as platinum (Pt), gold (Au), silver (Ag), palladium (Pd), ruthenium (Ru), rhodium (Rh), and osmium (Os); oxide-based catalysts, such as manganese oxide, iron oxide, cobalt oxide, and nickel oxide; and organic metal-based catalysts, such as cobalt phthalocyanine. Any appropriate oxidation and reduction catalyst for oxygen available in the art may be used.

The catalyst may be supported on a support. Examples of the support include an oxide, zeolite, clay mineral, and carbon. The oxide may include at least one oxide selected from alumina, silica, zirconium oxide, and titanium dioxide. The oxide may be an oxide comprising at least one metal selected from cerium (Ce), praseodymium (Pr), samarium (Sm), europium (Eu), terbium (Tb), thulium (Tm), ytterbium (Yb), antimony (Sb), bismuth (Bi), vanadium (V), chromium (Cr), manganese (Mn), iron (Fe), cobalt (Co), nickel (Ni), copper (Cu), niobium (Nb), molybdenum (Mo), and tungsten (W). Examples of the carbon available as the support include, but are not limited to, carbon black, such as Ketjen black, acetylene black, channel black, and lamp black; graphite, such as natural graphite, artificial graphite, and expanded graphite; activated carbon; and carbon fibers. Any appropriate material available as a support in the art may be used.

The cathode may further include a binder. The binder may include a thermoplastic resin or a thermosetting resin. Examples of the binder include, but are not limited to, polyethylene, polypropylene, polytetrafluoroethylene ("PTFE"), polyvinylidene fluoride ("PVDF"), styrene-butadiene rubber, a tetrafluoroethylene-perfluoroalkylvinylether copolymer, a vinylidene fluoride-hexafluoropropylene copolymer, a vinylidene fluoride-chlorotrifluoroethylene copolymer, an ethylene-tetrafluoroethylene copolymer, polychlorotrifluoroethylene, a fluorovinylidene-pentafluoropropylene copolymer, a propylene-tetrafluoroethylene copolymer, an ethylene-chlorotrifluoroethylene copolymer, a vinylidene fluoride-hexafluoropropylene-tetrafluoroethylene copolymer, a vinylidene fluoride-perfluoromethylvinylether-tetrafluoro ethylene copolymer, and an ethylene-acrylic acid copolymer, which may be used alone or in a combination. Any appropriate binder available in the art may be used.

To manufacture the cathode, an oxygen oxidation/reduction catalyst, a conductive material, and a binder may be mixed, and then may be added to an appropriate solvent to prepare a cathode slurry. The cathode slurry may be coated and dried on a surface of a current collector, optionally followed by press-molding to improve an electrode density, thereby resulting in the cathode. The cathode may optionally include a lithium oxide. The oxygen oxidation/reduction catalyst may be optionally omitted.

A porous body in a matrix or mesh form may be used as the current collector to facilitate diffusion of oxygen. A porous metal plate made of, for example, stainless steel, nickel, or aluminum may be used. Materials for the current collector are not particularly limited, and any appropriate material for current collectors available in the art may be used. The current collector may be coated with an anti-oxidation metal or alloy to prevent oxidation.

The separator may be the same as that described above in conjunction with the protected anode.

As described above, according to the above embodiments, a lithium air battery includes an anode with improved stability as compared with existing anodes, and thus may stably operate, and consequently have improved cell performance in terms of charge and discharge characteristics, lifetime, and electrical performance.

As used herein, the term "air" is not limited to atmospheric air, and for convenience may refer to a combination of gases including oxygen, or pure oxygen gas. This broad definition of "air" also applies to other terms, including "air battery" and "air electrode".

The lithium air battery is available either as a lithium primary battery or a lithium secondary battery. The lithium air battery may have any of various shapes, and in some embodiments, may have a shape like a coin, a button, a sheet, a stack, a cylinder, a plane, or a horn. The lithium air battery may be applicable as a large battery for electric vehicles.

According to another embodiment, a method of preparing a lithium ion-conductive protective layer includes:

thermally treating a mixture of a ceramic compound represented by Formula 3 with at least one inorganic oxide selected from TiO$_2$, ZnO$_2$, and GeO$_2$ to obtain a thermal-treatment product; and shaping the thermal-treatment product to prepare a film, and thermally treating the film to obtain a the lithium-ion conductive protective layer:

$$Li_{1+a''}Al_{b''}Ge_{2-c''}P_{3+e''}O_{12+f''} \qquad \text{Formula 3}$$

In Formula 3, 0≤a"≤1, 0≤b"≤1, 0≤c"≤1, 0≤e"≤0.1, and 0≤f"≤1.

The ceramic compound of Formula 3 may be at least one selected from Li$_{1.3}$Al$_{0.3}$Ge$_{1.7}$(PO$_4$)$_3$, Li$_{1.4}$Al$_{0.4}$Ge$_{1.6}$(PO$_4$)$_3$, Li$_{1.5}$Al$_{0.5}$Ge$_{1.5}$(PO$_4$)$_3$, Li$_{1.6}$Al$_{0.6}$Ge$_{1.4}$(PO$_4$)$_3$, and Li$_{1.7}$Al$_{0.7}$Ge$_{1.3}$(PO$_4$)$_3$.

The ceramic compound may comprise, e.g., be doped with, an inorganic oxide added thereto through thermal treatment. The doping of the inorganic oxide may improve the ionic conductivity of the ceramic compound.

An amount of the inorganic oxide may be from about 1 part to about 10 parts by weight, and in some embodiments, from about 2 parts to about 6 parts by weight, based on 100 parts by weight of the ceramic compound.

The thermal treatment may be performed by sintering at a temperature of about 800° C. or higher. When the temperature is within this range, the inorganic oxide may be inserted into the crystal structure of the ceramic compound to dope the ceramic compound.

The ceramic compound doped with an inorganic oxide by such thermal treatment may be molded in film form, and then thermally treated to obtain a lithium ion-conductive protective layer.

The shaping of the ceramic compound may be performed by any of a variety of methods available in the art, for example, casting, tape casting, embossing, or injection molding.

For example, the shaping of the doped ceramic compound may be formed using tape casting, which is alternately referred to in the art as continuous tape casting, knife casting, a doctor blade process, or the like, which are widely applicable in the field of manufacturing electronic ceramics. The ceramic compound may be easily molded in a film form by using tape casting, and then subjected to calcination to form a ceramic composite of Formula 1 above with improved lithium-ion conductivity.

The ceramic composite obtained as described above may be porous. In some embodiments, the method may further including filling pores in the ceramic composite with a cross-linkable polymer. As described above, the cross-linkable polymer may include at least one selected from an epoxy resin, an acryl resin, a polyamide resin, a polyimide resin, a polyimide-amide resin, a polycarbonate resin, a polyester resin, a phenol resin, a polyurethane resin, and a melamine resin.

The lithium ion-conductive protective layer including a sintered product of a mixture of a ceramic compound of Formula 3 above and at least one inorganic oxide as a dopant selected from $TiO_2$, $ZnO_2$, and $GeO_2$ may effectively suppress side reactions of the anode of the lithium air battery.

One or more embodiments will now be described in more detail with reference to the following examples. However, these examples are for illustrative purposes only and are not intended to limit the scope of the one or more embodiments.

Manufacture Example 1-(1)

Manufacture of Lithium Ion-Conductive Protective Layer

Citric acid was dissolved in water to prepare a 0.2M aqueous citric acid solution. 100 mL of the citric acid and 0.584 g of germanium butoxide were stirred at about 95° C. for about 20 hours.

0.097 g of lithium nitrate, 0.15 g of aluminum nitrate, and 0.345 g of $NH_4H_2PO_4$ were added to the resulting mixture, and then stirred for about 0.5 hours. Afterward, 5 g of ethylene glycol was added to the resulting mixture, and then stirred at about 120° C. for about 0.5 hours and then at about 150° C. for about 0.5 hours.

The resulting mixture was stirred at about 170° C. for 6 hours, and then thermally treated at about 500° C. for about 4 hours while stirring, and then at about 800° C. for about 5 hours while stirring, to synthesize a $Li_{1.4}Al_{0.4}Ge_{1.6}(PO_4)_3$ ceramic compound.

The $Li_{1.4}Al_{0.4}Ge_{1.6}(PO_4)_3$ ceramic compound was added with $TiO_2$ to obtain a mixture, which was then ground in a mortar, and heated in an oven at about 1100° C. for about 1 hour to prepare a ceramic composite. To investigate an improvement effect of ionic conductivity with respect to the amount of $TiO_2$, the amount of $TiO_2$ was varied to 1 wt %, 3 wt %, 5 wt %, and 7 wt % to prepare ceramic composites 200 mg of the heated product was ground and coated using a doctor blade to form a layer having a thickness of about 100 μm, which was then heated at about 1100° C. for about 1 hour to prepare a porous ceramic composite protective layer.

Manufacture Example 1-(2)

Manufacture of Lithium Ion-conductive Protective Layer 100 mg of the porous ceramic composite layer of Manufacture Example 1 was dipped in 1 mL of a tetrahydrofuran (TFH) solution including 2.16 mg of 1,3-phenylenediamine and 6.81 mg of 2,2-bis(4-glycidyloxyphenyl)propane, and heated in a vacuum at about 80° C. for about 2 hours to remove the solvent, followed by drying in a vacuum oven at about 150° C. for about 24 hours to prepare an organic-inorganic composite protective layer.

Manufacture Example 2-(1)

Manufacture of Lithium Ion-conductive Protective Layer

A ceramic composite protective layer was manufactured in the same manner as in Manufacture Example 1-(1), except that $ZrO_2$ instead of $TiO_2$ was added.

Manufacture Example 2-(2)

Manufacture of Lithium Ion-Conductive Protective Layer

An organic-inorganic composite protective layer was manufactured in the same manner as in Manufacture Example 1-(2), except that $ZrO_2$ instead of $TiO_2$ was added.

Manufacture Example 3-(1)

Manufacture of Lithium Ion-conductive Protective Layer

A ceramic composite protective layer was manufactured in the same manner as in Manufacture Example 1-(1), except that $GeO_2$ instead of $TiO_2$ was added.

Manufacture Example 3-(2)

Manufacture of Lithium Ion-Conductive Protective Layer

An organic-inorganic composite protective layer was manufactured in the same manner as in Manufacture Example 1-(2), except that $GeO_2$ instead of $TiO_2$ was added.

Comparative Manufacture Example 1-(1)

Manufacture of Lithium Ion-conductive Protective Layer

A ceramic composite protective layer was manufactured in the same manner as in Manufacture Example 1-(1), except that no $TiO_2$ was added.

Comparative Manufacture Example 1-(2)

Manufacture of Lithium Ion-Conductive Protective Layer

An organic-inorganic composite protective layer was manufactured in the same manner as in Manufacture Example 1-(2), except that no $TiO_2$ was added.

Example 1-(1)

Manufacture of Test Cell

An intermediate layer to be disposed between an anode and a lithium ion-conductive protective layer was manufactured as follows:

5 wt % of $BaTiO_3$ (having an average particle diameter of about 100 nm, available from Aldrich) was added to polyethylene oxide powder (having an average molecular weight of about $6 \times 10^5$, available from Aldrich), and then mixed to obtain a mixture, which was then dispersed in an acetonitrile (AN) solvent, followed by adding 1M $Li(CF_3SO_2)_2N$ (LiTFSI, Wako) to reach a mole ratio Li to O of about 1:18, and stirring for about 24 hours to obtain a gel solution. The gel solution was cast on a Teflon dish, and then dried at about 20° C. for about 24 hours to remove the AN solvent, and further dried in a vacuum at about 80° C. for about 12 hours to obtain a $PEO_{18}LiTFSI$—$BaTiO_3$ polymer-gel electrolyte sheet having an average thickness of about 100 μm.

The ceramic composite protective layer of Manufacture Example 1, the $PEO_{18}LiTFSI$—$BaTiO_3$ polymer-gel electrolyte sheet as an intermediate layer, a lithium metal having a thickness of about 300 μm, and a Cu current collector having a thickness of about 20 μm were packed in a 100 μm-thick aluminum pouch to manufactured an anode structure with a window of the ceramic composite lithium ion-conductive protective layer.

A beaker-cell was manufactured using the anode structure as an anode, and a platinum electrode as a cathode. 100 mL of a LiCl-saturated aqueous solution was used as a liquid electrolyte of the beaker-cell.

Example 1-(2)

Manufacture of Test Cell

A beaker-cell was manufactured in the same manner as in Example 1-(1), except that the ceramic composite lithium ion-conductive protective layer of Manufacture Example 1-(2) was used.

Example 2-(1)

Manufacture of Test Cell

A beaker-cell was manufactured in the same manner as in Example 1-(1), except that the ceramic composite lithium ion-conductive protective layer of Manufacture Example 2-(1) was used.

Example 2-(2)

Manufacture of Test Cell

A beaker-cell was manufactured in the same manner as in Example 1-(1), except that the ceramic composite lithium ion-conductive protective layer of Manufacture Example 2-(2) was used.

Example 3-(1)

Manufacture of Test Cell

A beaker-cell was manufactured in the same manner as in Example 1-(1), except that the ceramic composite lithium ion-conductive protective layer of Manufacture Example 3-(1) was used.

Example 3-(2)

Manufacture of Test Cell

A beaker-cell was manufactured in the same manner as in Example 1-(1), except that the ceramic composite lithium ion-conductive protective layer of Manufacture Example 3-(2) was used.

Comparative Example 1-(1)

Manufacture of Test Cell

A beaker-cell was manufactured in the same manner as in Example 1-(1), except that the ceramic composite lithium ion-conductive protective layer of Comparative Manufacture Example 1-(1) was used.

Comparative Example 1-(2)

Manufacture of Test Cell

A beaker-cell was manufactured in the same manner as in Example 1-(1), except that the ceramic composite lithium ion-conductive protective layer of Comparative Manufacture Example 1-(2) was used.

Evaluation Example 1

Evaluation of XRD Pattern of Ceramic Compound

To identify changes in an X-ray diffraction (XRD) pattern and a lattice constant according to types of dopants, XRD patterns of the ceramic compounds manufactured in Manufacture Examples 1-(1), 2-(1), and 3-(1) and Comparative Manufacture Example 1-(1) were analyzed using CuKα radiation. The results are shown in FIG. 3.

Figure 3:
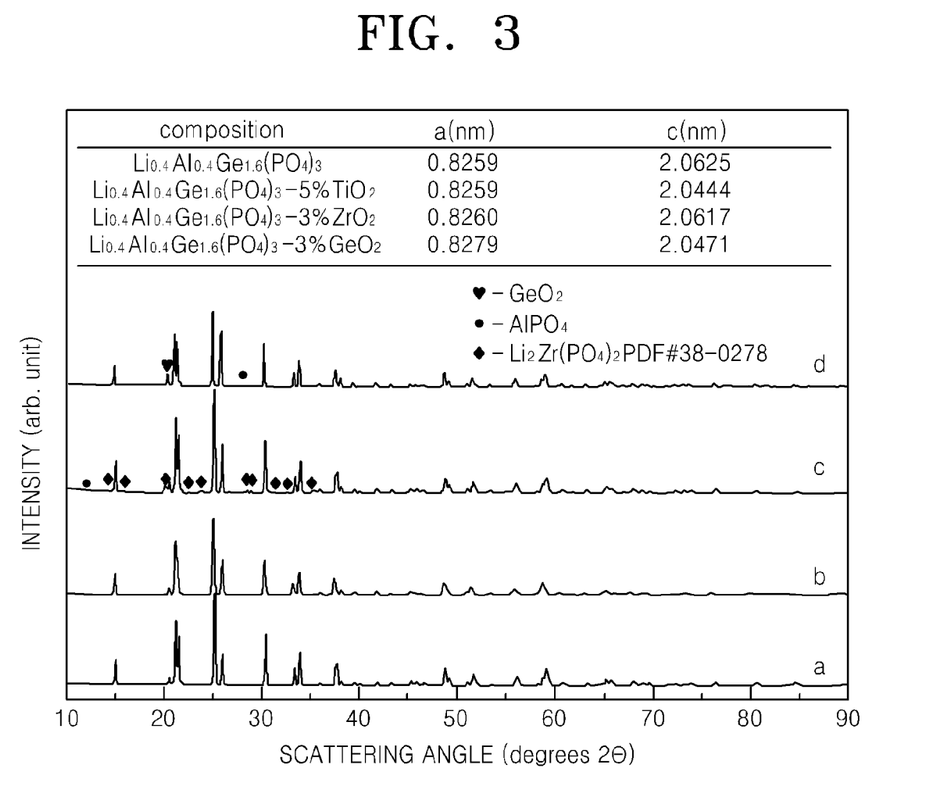
FIG. 3 is a graph of intensity (arbitrary units) versus scattering angle (degrees two-theta, 2θ) showing X-ray diffraction patterns of ceramic compounds prepared in Manufacture Examples 1-(1), 2-(1), and 3-(1) and Comparative Manufacture Example 1-(1)

Referring to FIG. 3, the $Li_{1.4}Al_{0.4}Ge_{1.6}(PO_4)_3$ compound of Manufacture Example 1-(1) doped with 5 wt % of $TiO_2$ was found to have a reduced c-lattice constant (from 2.0625 nm) of 2.0444 nm and no change in a-lattice constant. The compound of Manufacture Example 3-(1) doped with 3 wt % $GeO_2$ was found to have a $GeO_2$ diffraction peak, a c-lattice constant of about 2.0471 nm, and no change in a-lattice constant. The compound of Manufactured Example 2-(1) doped with 3 wt % $ZrO_2$ was found to have a $Li_2Zr(PO_4)_3$ peak and no significant change both in a-lattice constant and c-lattice constant. These results indicate that some $Ge^{4+}$ cations of $Li_{1.4}Al_{0.4}Ge_{1.6}(PO_4)_3$ were substituted with $Ti^{4+}$ $Zr^{4+}$, or $Ge^{4+}$ cations.

Evaluation Example 2

Measurement of Ionic Conductivity of Ceramic Compound

Ion conductivities of the ceramic composite lithium ion-conductive protective layers of Manufacture Examples 1-(1), 2-(1), 3-(1), and Comparative Manufacture Example 1-(1) were measured. The results are shown in FIG. 4.

The ionic conductivities of the lithium ion-conductive protective layers were calculated using Equation 1 below, in which σ is ionic conductivity, I is current, R is resistance, and A is area. The impedance of a lithium symmetric cell and current decay with respect to input voltage and time were measured and used to calculate the ionic conductivities.

$$\sigma = I/(R_b \cdot A) \quad \text{Equation 1}$$

Figure 4:
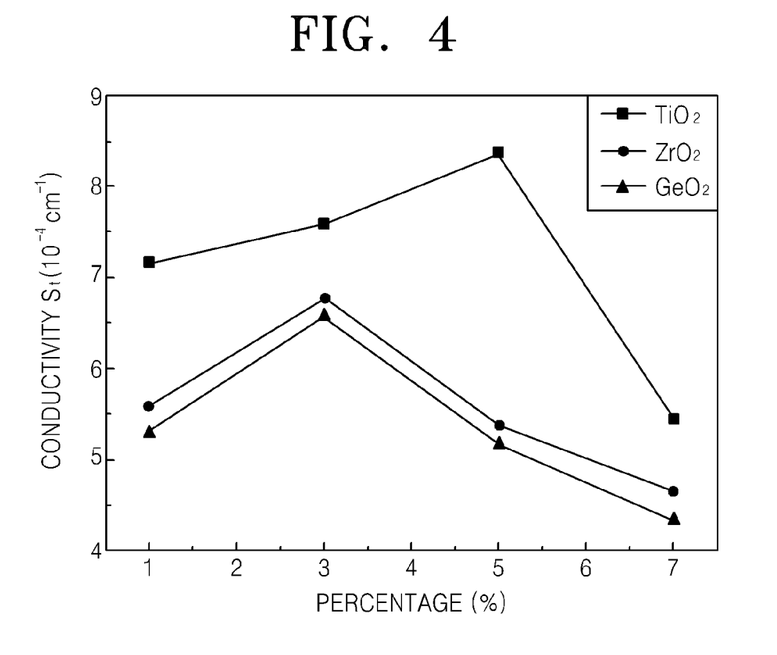
FIG. 4 is a graph of conductivity ($10^{-4}$ $cm^{-1}$) versus percentage (percent, %) illustrating the results of measuring ionic conductivities of ceramic composite lithium ion-conductive protective layers of Manufacture Example 1-(1), 2-(1), and 3-(1) and Comparative Manufacture Example 1-(1)

Referring to FIG. 4, the doping with $TiO_2$, $ZnO_2$, and $GeO_2$ was found to improve ionic conductivities. In particular, the doping with 5 wt % of $TiO_2$, about 3 wt % of $ZnO_2$, and 3 wt % of $GeO_2$ were found to have the highest ionic conductivity improvement effect of those in other amounts of each of the additives.

Evaluation Example 3

Moisture Permeability Evaluation

To identify an effect of filling pores in the ceramic composite lithium ion-conductive protective layer with a polymer, moisture permeability characteristics of the lithium ion-conductive protective layers of Manufacture Examples 1-(1) and 1-(2) were evaluated. Each of the lithium ion-conductive protective layers was placed in a U-shaped cell with a 1 M LiCl solution in a side region of the lithium ion-conductive protective layer and a sensor for sensing $Cl^-$ ions in salt-free water in the opposite side region. Changes in the amount of $Cl^-$ ions with respect to time were measured. The results are shown in FIG. 5.

Figure 5:
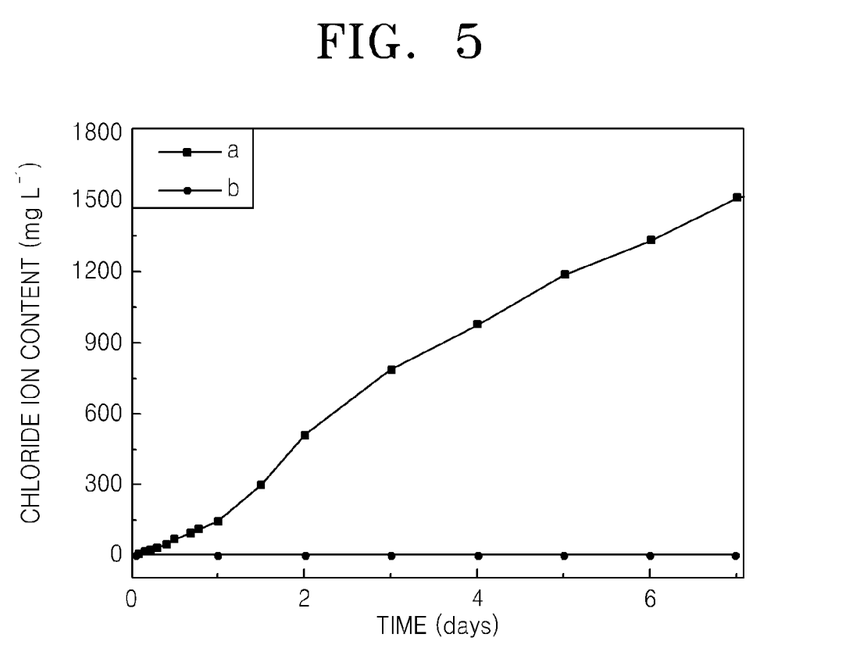
FIG. 5 is a graph of chloride ion content (milligrams per liter, $mgL^{-1}$) versus time (days) illustrating the results of moisture permeability analysis of lithium ion-conductive protective layers of Manufacture Examples 1-(1) and 1-(2)

Referring to FIG. 5, the lithium ion-conductive protective layer of Manufacture Example 1-(2) with pores filled with epoxy resin was found to be nearly free of moisture permeation.

Evaluation Example 4

Evaluation of Impedance Stability with Respect to Time

Impedance characteristics of the test cell manufactured in Example 1-(2) were evaluated using an impedance measurement device (Materials mates 7260, available from Materials Mates). The cell operation temperature was maintained at about 60° C. The results of impedance analysis over storage time are shown in FIG. 6.

Figure 6:
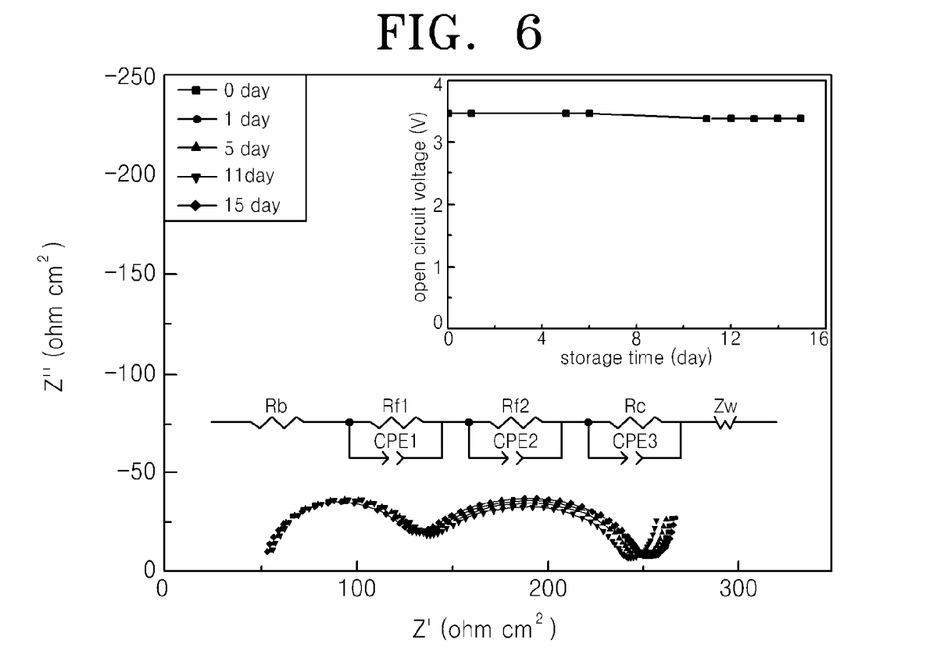
FIG. 6 is a graph imaginary resistance (Z", ohms·cm²) versus real resistance (Z', ohms·cm²) illustrating the results of impedance characteristic evaluation of a test cell of Example 1-(2)

FIG. 6 illustrates the impedance characteristics of the test cell of Example 1-(2) at an initial stage and after 1 day, 5 days, 11 days, and 15 days.

In FIG. 6, the size (diameter) of a half circle corresponds to a magnitude of resistance ($R_a$) in the anode. Referring to FIG. 6, in the test cell of Example 1-(2) the lithium anode was found to be protected for a long time, and the lithium ion-conductive protective layer had stable storage characteristics.

Evaluation Example 7

Cycle Characteristic Evaluation

The beaker-cell of Example 1-(2) was charged and discharged by applying a constant current of about 1.0 $mA/cm^2$ at about 60° C. for about 1 hour (formation process).

The beaker-cell after the formation process was subjected to about 15 cycles of charging and discharging by applying a constant current of about 1.0 $mA/cm^2$ at about 60° C. for about 2 hours to observe changes in voltage over time. In this regard, a platinum/air electrode was used as a reference electrode. The results are shown in FIG. 7.

Figure 7:
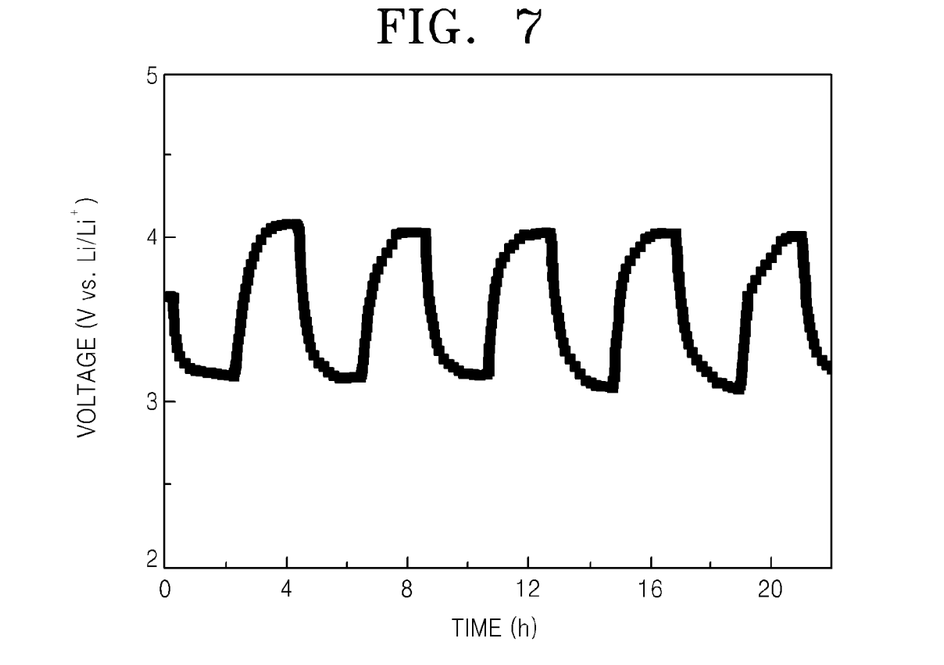
FIG. 7 is a graph of voltage (volts versus Li/Li⁺) versus time (hours) illustrating the results of cycle characteristic evaluation of the test cell of Example 1-(2).

Referring to FIG. 7, the beaker-cell of Example 1-(2) was found to exhibit stable charge-discharge behaviors.

As described above, according to the one or more embodiments, a protected anode capable of reversibly incorporating, e.g., intercalating and deintercalating, lithium ions has a protective layer including a doped ceramic compound to improve ionic conductivity and to be less vulnerable to side reactions. A lithium air battery with improved conductivity and improved charge/discharge characteristics may be manufactured using the protected anode.

It should be understood that the exemplary embodiments described therein should be considered in a descriptive sense only and not for purposes of limitation. Descriptions of features or aspects within each embodiment should be considered as available for other similar features, advantages, or aspects in other embodiments.

What is claimed is:

1. A protected anode comprising:
an anode including lithium or a material capable of reversibly incorporating lithium ions; and
a lithium ion-conductive protective layer on the anode and comprising a ceramic composite represented by Formula 1:

$$Li_{1+a}Al_bGe_{2-c}M_dP_{3+e}O_{12+f} \quad \text{Formula 1}$$

wherein M is at least one element selected from titanium (Ti), zirconium (Zr), and germanium (Ge), 0≤a≤1, 0≤b≤1, 0≤c≤1, 0≤d≤0.5, 0≤e≤0.1, and 0≤f≤1.

2. The protected anode of claim 1, wherein the ceramic composite is represented by Formula 2 below:

$$Li_{1.4+a'}Al_{0.4+b'}Ge_{1.6+c'}M_{d'}P_{3+e'}O_{12+f'} \quad \text{Formula 2}$$

wherein M is at least one element selected from titanium (Ti), zirconium (Zr), and germanium (Ge), −0.1≤a'≤0.1, −0.1≤b'≤0.1, −0.1≤c'≤0.1, 0.04≤d'≤0.4, 0≤e'≤0.1, and 0≤f≤0.9.

3. The protected anode of claim 1, wherein the lithium ion-conductive protective layer is porous.

4. The protected anode of claim 3, wherein the lithium ion-conductive protective layer further comprises a cross-linkable first polymer, which is disposed in pores of the lithium ion-conductive protective layer.

5. The protected anode of claim 4, wherein the cross-linkable first polymer is a thermoset.

6. The protected anode of claim 4, wherein the cross-linkable first polymer comprises at least one selected from an epoxy, an acryl, a polyamide, a polyimide, a polyimide amide, a polycarbonate, a polyester, a phenol, a polyurethane, and a melamine.

7. The protected anode of claim 4, wherein the cross-linkable first polymer has a lithium ion conductivity of about $10^{-4}$ Siemens per centimeter or less.

8. The protected anode of claim 4, wherein an amount of the cross-linkable first polymer is from about 0.01 parts to about 20 parts by weight, based on 100 parts by weight of the lithium ion-conductive protective layer.

9. The protected anode of claim 1, wherein the lithium ion-conductive protective layer has a thickness of from about 1 micrometer to about 500 micrometer.

10. The protected anode of claim 1, wherein the lithium ion-conductive protective layer has a moisture permeability equivalent to pass about 100 milligrams per liter or less of $Cl^-$ ions per day.

11. The protected anode of claim 1, further comprising an intermediate layer between the anode and the lithium ion-conductive protective layer, the intermediate layer comprising at least one selected from a liquid electrolyte including a separator, a non-aqueous solvent, and a lithium salt; an inorganic solid electrolyte membrane; a polymer solid electrolyte membrane; a gel solid electrolyte membrane; and a lithium ion-conductive solid electrolyte membrane.

12. The protected anode of claim 11, wherein the at least one intermediate layer further comprises an insulating inorganic filler.

13. The protected anode of claim 11, wherein the separator comprises at least one selected from a polyethylene oxide-based polymer, a polypropylene-based polymer, a polyacrylonitrile-based polymer, a polyvinylidene-fluoride-based polymer, and a polymethylmethacrylate-based polymer.

14. The protected anode of claim 11, wherein the lithium salt comprises at least one selected from $LiPF_6$, $LiBF_4$, $LiSbF_6$, $LiAsF_6$, $LiN(SO_2C_2F_5)_2$, $Li(CF_3SO_2)_2N$, $LiC_4F_9SO_3$, $LiClO_4$, $LiAlO_2$, $LiAlCl_4$, $LiN(C_xF_{2x+1}SO_2)(C_yF_{2y+1}SO_2)$ wherein x and y are natural numbers, LiF, LiBr, LiCl, LiI, and lithium bis(oxalato) borate.

15. The protected anode of claim 12, wherein the insulating inorganic filler is selected from the group consisting of $SiO_2$, $BaTiO_3$, $TiO_2$, $Al_2O_3$, and $Li_2CO_3$.

16. The protected anode of claim 11, wherein the at least one intermediate layer has an ionic conductivity of about $2 \times 10^{-3}$ Siemens per centimeter or greater, a lithium ion transfer coefficient of about 0.16 or greater, and a lithium ion mobility of about $1.1 \times 10^{-6}$ square centimeters per volt-seconds or greater.

17. A lithium air battery comprising:
the protected anode of claim 1; and
a cathode using oxygen as a cathode active material.

18. A method of manufacturing a protected anode according to claim 1, the method comprising:
providing an anode including lithium or a material capable of reversibly incorporating lithium ions; and
preparing a lithium ion-conductive protective layer on the anode,
wherein the preparing comprises:
thermally treating a mixture of a ceramic compound represented by Formula 3

$$Li_{1+a''}Al_{b''}Ge_{2-c''}P_{3+e''}O_{12+f''} \qquad \text{Formula 3}$$

wherein $0 \leq a'' \leq 1$, $0 \leq b'' \leq 1$, $0 \leq c'' \leq 1$, $0 \leq e'' \leq 0.1$, and $0 \leq f'' \leq 1$, and at least one inorganic oxide selected from $TiO_2$, $ZnO_2$, and $GeO_2$ to obtain a thermal-treatment product;
shaping the thermal-treatment product to prepare a film; and
thermally treating the film to obtain the lithium ion-conductive protective layer.

19. The method of claim 18, wherein the ceramic compound of Formula 3 is at least one selected from $Li_{1.3}Al_{0.3}Ge_{1.7}(PO_4)_3$, $Li_{1.4}Al_{0.4}Ge_{1.6}(PO_4)_3$, $Li_{1.5}Al_{0.5}Ge_{1.5}(PO_4)_3$, $Li_{1.6}Al_{0.6}Ge_{1.4}(PO_4)_3$, and $Li_{1.7}Al_{0.7}Ge_{1.3}(PO_4)_3$.

20. The method of claim 18, further comprising filling pores in the lithium ion-conductive protective layer with a cross-linkable polymer.

* * * * *